United States Patent
Nakagawa (10) Patent No.: US 10,885,723 B2
(45) Date of Patent: Jan. 5, 2021

(54) ENCRYPTED COMMUNICATION SYSTEM AND METHOD FOR CONTROLLING ENCRYPTED COMMUNICATION SYSTEM

(71) Applicant: TOYOTA JIDOSHA KABUSHIKI KAISHA, Toyota (JP)

(72) Inventor: Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 15/850,020

(22) Filed: Dec. 21, 2017

(65) Prior Publication Data

US 2018/0183773 A1 Jun. 28, 2018

(30) Foreign Application Priority Data

Dec. 26, 2016 (JP) .................................. 2016-251969

(51) Int. Cl.
*H04L 29/06* (2006.01)
*G07C 5/00* (2006.01)
*H04L 29/08* (2006.01)
*H04W 4/44* (2018.01)
(Continued)

(52) U.S. Cl.
CPC ............... *G07C 5/008* (2013.01); *G08G 1/20* (2013.01); *H04L 63/0428* (2013.01); *H04L 63/062* (2013.01); *H04L 63/0823* (2013.01); *H04L 63/0892* (2013.01); *H04L 63/102* (2013.01); *H04L 67/12* (2013.01); *H04W 4/44* (2018.02); *H04W 12/0401* (2019.01); *B60W 2556/65* (2020.02); *H04L 2209/84* (2013.01)

(58) Field of Classification Search
CPC ... H04L 63/062; H04L 63/0428; H04L 67/12; H04L 63/102; H04L 63/0892; H04L 63/0823; H04L 2209/84; G07C 5/008; H04W 4/44; H04W 12/02; H04W 12/04; G08G 1/20; B60W 2550/408
USPC .......................................................... 713/168
See application file for complete search history.

(56) References Cited

U.S. PATENT DOCUMENTS 9,083,581 B1 * 7/2015 Addepalli ......... H04W 72/0406
2010/0180118 A1 * 7/2010 Nakatsugawa ......... G06F 21/72
713/169

(Continued)

FOREIGN PATENT DOCUMENTS

JP 2007-013754 A 1/2007

*Primary Examiner* — Michael S McNally
(74) *Attorney, Agent, or Firm* — Hunton Andrews Kurth LLP (57) ABSTRACT

An encrypted communication system includes on-board devices configured to perform encrypted communication with a server located outside a vehicle. Each of the on-board devices includes an encrypted communication portion configured to perform encrypted communication with the server using an encryption key unique to a corresponding one of the on-board devices and a priority setting portion configured to set priority ranks of the on-board devices for encrypted communication. When each of the on-board devices performs encrypted communication with the server and if any one of the on-board devices is set to a higher priority rank, the on-board device is configured to perform encrypted communication with the server via the encrypted communication portion of the on-board device having the higher priority rank.

8 Claims, 4 Drawing Sheets

(51) Int. Cl.
*G08G 1/00* (2006.01)
*H04W 12/04* (2009.01)

(56) References Cited

U.S. PATENT DOCUMENTS

2014/0005859 A1* 1/2014 Baskin ............... G07C 9/00309
701/2
2018/0368062 A1* 12/2018 Koue .................... H04W 48/20

* cited by examiner

| ECU Kind | Cipher Strength | Encrypted Communication with Center | Encrypted Communication Priority Flag |
|---|---|---|---|
| 1st ECU | Low | × | × |
| 2nd ECU | Medium | × | ○ |

| ECU Kind | Cipher Strength | Encrypted Communication with Center | Encrypted Communication Priority Flag |
|---|---|---|---|
| 1st ECU | Low | × | × |
| 2nd ECU | Medium | × | × |
| 3rd ECU (Added) | High | × | ○ |

| ECU Kind | Cipher Strength | Encrypted Communication with Center | Encrypted Communication Priority Flag |
|---|---|---|---|
| 1st ECU | Low | × | × |
| 2nd ECU | Medium | ○ | ○ |

| ECU Kind | Cipher Strength | Encrypted Communication with Center | Encrypted Communication Priority Flag |
|---|---|---|---|
| 1st ECU | Low | × | × |
| 2nd ECU | Medium | ○ | ○ |
| 3rd ECU (Added) | High | × | × |

Fig.4

ENCRYPTED COMMUNICATION SYSTEM AND METHOD FOR CONTROLLING ENCRYPTED COMMUNICATION SYSTEM

CROSS-REFERENCE TO RELATED APPLICATION

The present application claims priority to Japanese Patent Application No. 2016-251969 filed Dec. 26, 2016, which is incorporated herein by reference in its entirety.

BACKGROUND

The present invention relates to an encrypted communication system that performs encrypted communication with a server located outside vehicles and a method for controlling the encrypted communication system.

Japanese Laid-Open Patent Publication No. 2007-13754 describes one example of an encrypted communication system in which when a mobile station including an on-board device enters a wireless communication performable area of a base station, the mobile station and the base station establish a wireless communication session to perform a mutual verification. If the mutual verification is accomplished, the base station notifies the server that the mobile station is a valid client. Consequently, the server generates an encryption key that will be shared with the mobile station and provides the encryption key to the mobile station via the base station. When the mobile station moves and establishes a wireless communication session with another base station, the sharing of the encryption key between the mobile station and the server eliminates the need for performing a new client verification related to the mobile station. This increases the speed of encrypted communication performed between the mobile station and the server.

The above system assumes a configuration in which the mobile station and the server perform one-on-one encrypted communication with each other. However, a plurality of on-board devices may be installed in a vehicle to independently perform encrypted communication with the server. In this case, if the on-board devices are each configured to perform encrypted communication with the server using a unique encryption key, the resources of the server used for the encrypted communication process are increased in accordance with the number of on-board devices performing encrypted communication.

SUMMARY

It is an object of the present invention to provide an encrypted communication system that allows a plurality of on-board devices to independently perform encrypted communication with a server located outside a vehicle while reducing the resources of the server used for the encrypted communication process. It is also an object of the present invention to provide a method for controlling the encrypted communication system.

To achieve the above object, an encrypted communication system includes a plurality of on-board devices configured to perform encrypted communication with a server located outside a vehicle. Each of the plurality of on-board devices includes an encrypted communication portion configured to perform encrypted communication with the server using an encryption key unique to a corresponding one of the plurality of on-board devices and a priority setting portion configured to set priority ranks of the plurality of on-board devices for encrypted communication. When each of the plurality of on-board devices performs encrypted communication with the server and if any one of the plurality of on-board devices is set to a higher priority rank, the on-board device is configured to perform encrypted communication with the server via the encrypted communication portion of the on-board device having the higher priority rank.

To achieve the above object, a method for controlling an encrypted communication system, which includes a plurality of on-board devices configured to perform encrypted communication with a server located outside a vehicle, includes having each of the plurality of on-board devices set priority ranks of the plurality of on-board devices for encrypted communication and having, when each of the plurality of on-board devices performs encrypted communication with the server and if any one of the plurality of on-board devices is set to a higher priority rank, the on-board device perform encrypted communication with the server using an encryption key unique to the on-board device having the higher priority rank via the on-board device having the higher priority rank.

To achieve the above object, an encrypted communication system includes a plurality of on-board devices configured to perform encrypted communication with a server located outside a vehicle. Each of the plurality of on-board devices includes circuitry. The circuitry is configured to set priority ranks of the plurality of on-board devices for encrypted communication. When the circuitry performs encrypted communication with the server and if any one of the plurality of on-board devices is set to a higher priority rank, the circuitry is configured to perform encrypted communication with the server using an encryption key unique to the on-board device having the higher priority rank via the on-board device having the higher priority rank.

Here, "set priority ranks of the plurality of on-board devices for encrypted communication" means that priority ranks for encrypted communication are automatically or manually set in advance before or when the vehicle is shipped or that priority ranks for encrypted communication are automatically or manually set after the shipment of the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of an encrypted communication system will now be described with reference to the drawings.

The encrypted communication system includes a plurality of electronic control units (ECUs), functioning as on-board devices. The ECUs perform encrypted communication with a center, which functions as a server located outside a vehicle to control travel information of a plurality of vehicles. Each of the ECUs may be configured as circuitry including 1) one or more processors that operate in accordance with computer programs (software), 2) one or more dedicated hardware circuits such as ASICs, or 3) the combination of these. Each processor includes a CPU and memories such as a RAM and a ROM. The memories store program codes or instructions configured for the CPU to execute processes. The memories, or computer readable media, include any applicable medium that is accessible with a versatile or dedicated computer.

Figure 1:
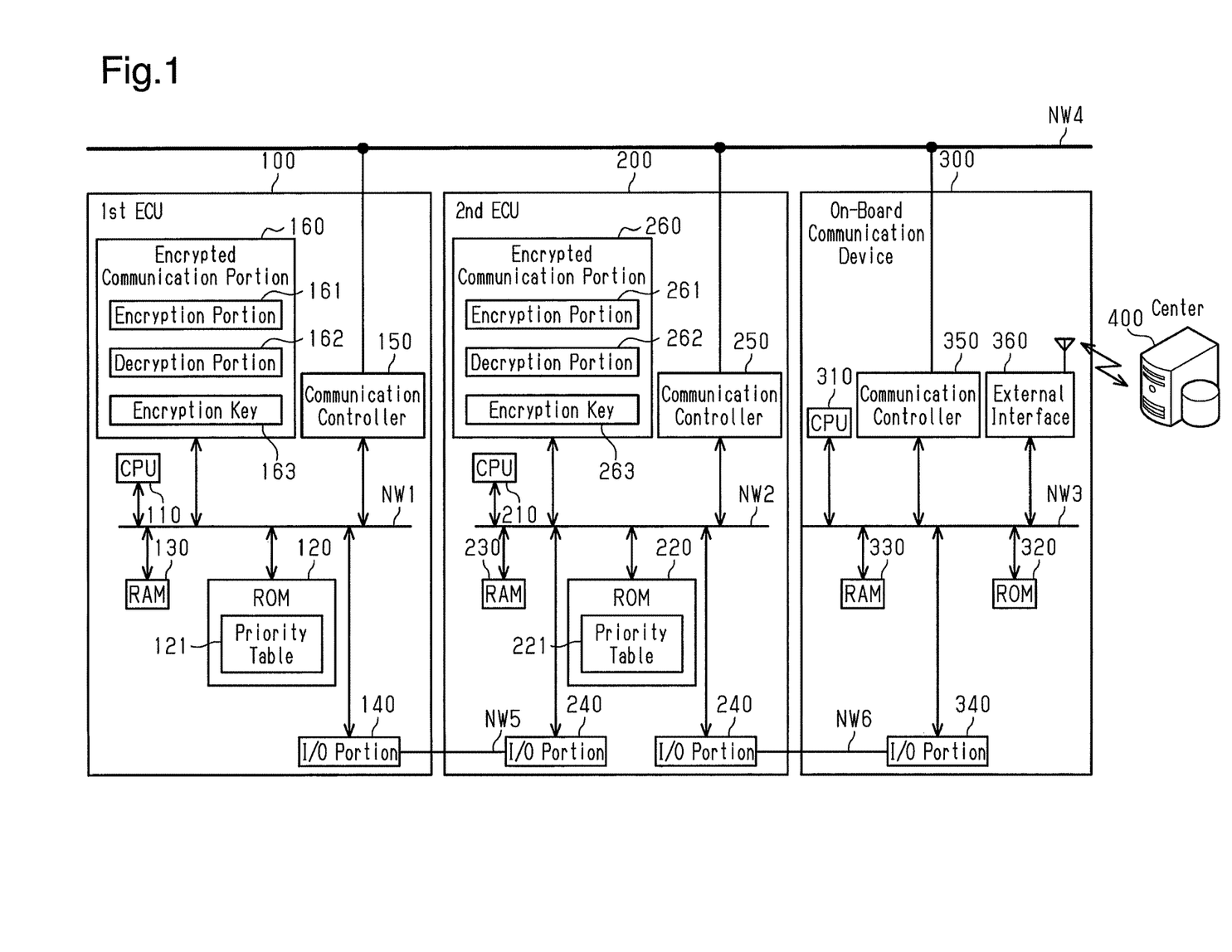
FIG. 1 is a block diagram showing the schematic structure of one embodiment of an encrypted communication system.

More specifically, as shown in FIG. 1, a first ECU 100 and a second ECU 200 respectively include, for example, central processing units 110, 210 (CPUs), read-only memories 120, 220 (ROMs), random access memories 130, 230 (RAMs), I/O portions 140, 240 (input-output port portions), communication controllers 150, 250, and encrypted communication portions 160, 260 that are mutually connected by communication buses NW1, NW2. Additionally, a vehicle network NW4 is connected between the communication controller 150 of the first ECU 100 and the communication controller 250 of the second ECU 200. Examples of the first ECU 100 and the second ECU 200 include a drive system ECU that controls, for example, an engine, a brake device, or a steering device, a body system ECU that controls, for example, an air-conditioning device or a meter displaying various vehicle states, and an information system ECU that controls, for example, an automotive navigation system that performs a route guide from the current position to the destination. The communication controllers 150, 250 of the ECUs 100, 200 transmit and receive communication data such as various kinds of sensor data and control data through the vehicle network NW4. In the present embodiment, the vehicle network NW4 transmits and receives the communication data in accordance with a communication protocol specified in a controller area network (CAN).

The first ECU 100 and the second ECU 200 are also connected to an on-board communication device 300 through the vehicle network NW4. That is, the vehicle network NW4 mutually connects three or more on-board devices, including the first ECU 100, the second ECU 200, and the on-board communication device 300. The on-board communication device 300 includes, for example, a CPU 310, a ROM 320, a RAM 330, an I/O portion 340, a communication controller 350, and an external interface 360 that are mutually connected by a communication bus NW3. The external interface 360 performs communication with the outside of the vehicle. When the encrypted communication system performs data communication with a communication device located on an external network through the vehicle network NW4 and the external network, the secrecy of communication data is required.

In this regard, in the present embodiment, the first ECU 100 and the second ECU 200 respectively include the encrypted communication portions 160, 260, which perform encrypted communication with a center 400 located outside a vehicle using, for example, a secure socket layer (SSL). The encrypted communication portions 160, 260 respectively include encryption portions 161, 261, which encrypt data that they will transmit. When the encrypted communication portions 160, 260 transmit communication data, the encryption portions 161, 261 encrypt the communication data using encryption keys 163, 263, which are managed by the encrypted communication portions 160, 260, to convert the communication data into secrecy data.

In the present embodiment, each of the encryption keys 163, 263 is a public key of the center 400 included in an electronic certificate that is sent by the center 400 when the encrypted communication is performed with the center 400. Each of the encrypted communication portions 160, 260 verifies that the transmitter of the public key is the authentic center 400 based on the electronic certificate transmitted from the center 400. The encryption key 163 (public key) held by the first ECU 100 and the encryption key 263 held by the second ECU 200 are different pieces of key data.

When the encrypted communication portions 160, 260 perform the encrypted communication with the center 400, the encrypted communication portions 160, 260 transmit their own IDs to the center 400 in addition to the communication data, which has been encrypted by the encryption keys 163, 263. When the center 400 receives the encrypted communication data from the encrypted communication portions 160, 260, the center 400 decrypts the encrypted communication data using encryption keys (secret keys functioning as decryption keys) that it manages. More specifically, when the center 400 obtains encrypted communication data from one of the encrypted communication portions 160, 260, the center 400 retrieves the encryption key (secret key) corresponding to the ID of the one of the encrypted communication portions 160, 260, serving as the transmitter, from a database that it manages and then decrypts the encrypted communication data using the retrieved encryption key.

In the same manner, the center 400 encrypts communication data using the encryption key (public key) of the first ECU 100. The first ECU 100 includes a decryption portion 162. When the first ECU 100 obtains the encrypted communication data from the center 400, the decryption portion 162 decrypts the encrypted communication data using an encryption key (secret key functioning as decryption key) that it manages. The center 400 encrypts communication data using the decryption key (public key) of the second ECU 200. The second ECU 200 includes a decryption portion 262. When the second ECU 200 receives the encrypted communication data from the center 400, the decryption portion 262 decrypts the encrypted communication data using an encryption key (secret key functioning as decryption key) that it manages. Additionally, when the first ECU 100 and the second ECU 200 communicate with each other, communication data is encrypted in the same manner. The encrypted communication data is decrypted using the encryption key (secret key functioning as decryption key) corresponding to the ID of one of the encrypted communication portions 160, 260 serving as the transmitter.

If the first ECU 100 and the second ECU 200 individually perform encrypted communication with the center 400 via their own encrypted communication portions 160, 260, the center 400 needs to manage both the encryption key that is used in encrypted communication with the first ECU 100 and the encryption key that is used in encrypted communication with the second ECU 200. Thus, as the number of ECUs performing encrypted communication is increased, the resources of the center 400 used for the encrypted communication process would be increased.

In this regard, in the present embodiment, when the first ECU 100 and the second ECU 200 perform encrypted communication with the center 400 located outside the vehicle, the first ECU 100 and the second ECU 200 first refer to priority tables 121, 221, which serve as priority setting portions that set priority ranks of the ECUs 100, 200 for encrypted communication. Then, each of the ECUs 100, 200 performs encrypted communication with the center 400 via the encrypted communication portion of its peer ECU when the priority rank of the peer ECU is relatively high.

Figure 2A:
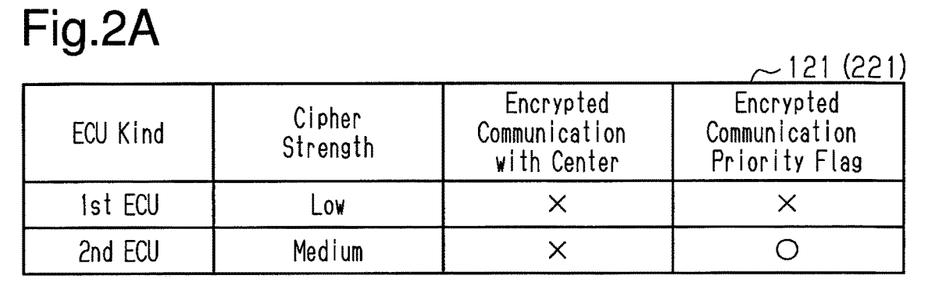
FIGS. 2A and 2B are schematic charts showing one example of contents set in a priority table.

FIG. 2A shows one example of data contents set in the priority tables 121, 221. In the example shown in FIG. 2A, neither of the first ECU 100 and the second ECU 200 has performed encrypted communication with the center 400. Thus, the center 400 does not yet hold any one of an encryption key used in the encrypted communication performed with the first ECU 100 and an encryption key used in the encrypted communication performed with the second ECU 200. Additionally, in this example, the cipher strength of encrypted communication of the first ECU 100 using the encryption key 163 is categorized as "low," whereas the cipher strength of encrypted communication of the second ECU 200 using the encryption key 263 is categorized as "medium." Hence, the encrypted communication performed by the second ECU 200 has a higher cipher strength than the encrypted communication performed by the first ECU 100. Thus, a priority flag of encrypted communication is set on the second ECU 200 so that the second ECU 200 is given a higher priority rank than the first ECU 100. The cipher strength of encrypted communication is evaluated based on, for example, the number of bits in an encryption key or an encryption algorithm.

Figure 2B:
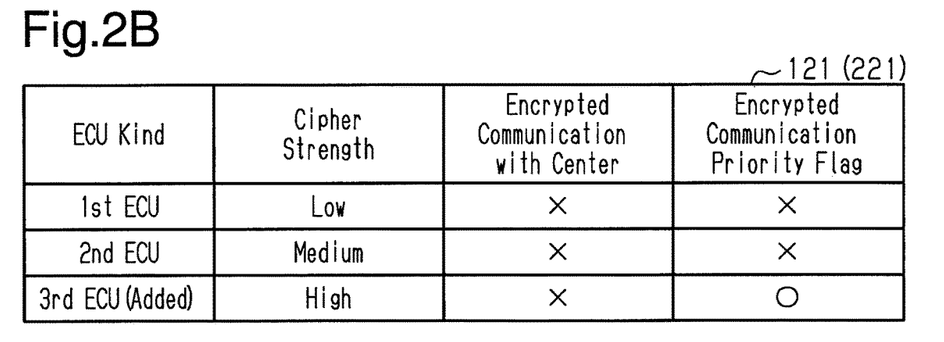

FIG. 2B shows one example of data contents set in the priority tables 121, 221 when a third ECU is newly connected to the vehicle network NW4 after the priority flag of encrypted communication is set on the second ECU 200 as shown in FIG. 2A. In the example shown in FIG. 2B, the cipher strength of encrypted communication performed by the added third ECU is categorized as "high." Thus, the encrypted communication performed by the third ECU has a higher cipher strength than the encrypted communications performed by the first ECU 100 and the second ECU 200. Accordingly, the subject on which the priority flag of encrypted communication is set is switched from the second ECU 200 to the third ECU so that the third ECU is set to a higher priority rank than the first ECU 100 and the second ECU 200.

Figure 3A:
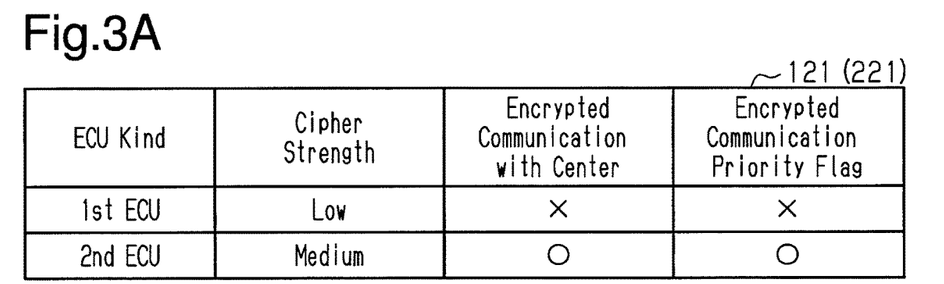
FIGS. 3A and 3B are schematic charts showing another example of contents set in a priority table.

FIG. 3A shows another example of data contents set in the priority tables 121, 221. In the example shown in FIG. 3A, while the first ECU 100 has not performed encrypted communication with the center 400, the second ECU 200 has performed encrypted communication with the center 400. Thus, the center 400 holds the encryption key used in the encrypted communication performed with the second ECU 200. Therefore, the priority flag of encrypted communication is set on the second ECU 200 so that the second ECU 200 is given a higher priority rank than the first ECU 100.

Figure 3B:
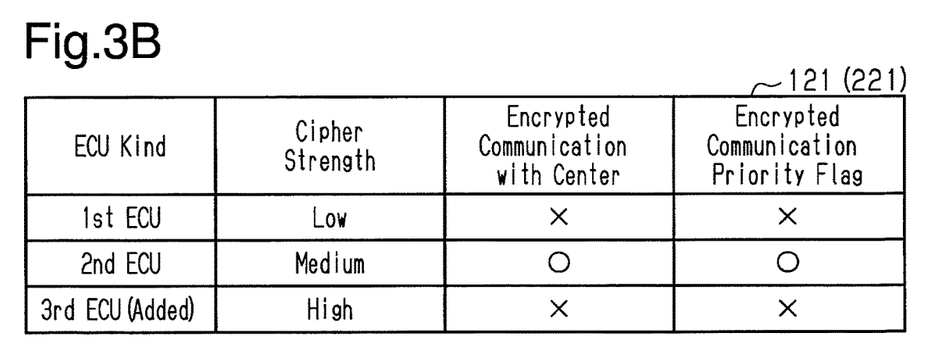

FIG. 3B shows one example of data contents set in the priority tables 121, 221 when a third ECU is newly connected to the vehicle network NW4 after the priority flag of encrypted communication is set on the second ECU 200 as shown in FIG. 3A. In the example shown in FIG. 3B, the cipher strength of encrypted communication performed by the added third ECU is categorized as "high." Thus, the encrypted communication performed by the third ECU has a higher cipher strength than the encrypted communications performed by the first ECU 100 and the second ECU 200. However, as described above, the second ECU 200 has performed encrypted communication with the center 400, and the center 400 already holds the encryption key used in the encrypted communication with the second ECU 200. Thus, the subject of the priority flag of encrypted communication is not switched to the third ECU, and the second ECU 200 keeps the priority flag. Therefore, the second ECU 200 is set to a higher priority rank than the first ECU 100 and the third ECU. The third ECU, which is newly connected to the vehicle network NW4, also has a priority table in which data contents are set as shown in FIG. 3B.

As shown in FIG. 1, a dedicated communication line NW5, which is a communication path differing from the vehicle network NW4 described above, is provided between the I/O portion 140 of the first ECU 100 and the I/O portion 240 of the second ECU 200 to connect the ECUs 100, 200 to each other separately from other devices, that is, independently from other devices. In the same manner, a dedicated communication line NW6, which is a communication path differing from the vehicle network NW4 described above, is provided between the I/O portion 240 of the second ECU 200 and the I/O portion 340 of the on-board communication device 300 to connect the second ECU 200 and the on-board communication device 300 to each other separately from other devices, that is, independently from other devices. For example, a USB communication cable, a PCI-E bus, or a serial connection line may be used as the communication lines NW5, NW6. The communication speed of the dedicated communication lines NW5, NW6, which connect the ECUs 100, 200 to each other or the second ECU 200 and the on-board communication device 300 separately from other devices, that is, independently from other devices, tends to be higher than the communication speed of the vehicle network NW4, which mutually connects the ECUs 100, 200 and the on-board communication device 300. Additionally, the secrecy of information against an external unauthorized access is easily ensured by the dedicated communication lines NW5, NW6 as compared to the vehicle network NW4.

In the present embodiment, when each of the first ECU 100 and the second ECU 200 performs encrypted communication with the center 400, the first ECU 100 and the second ECU 200 refer to the priority tables 121, 221 and, if another ECU has a higher priority rank, transmits unencrypted communication data to the ECU having the higher priority rank through the communication line NW5. When the ECU having the higher priority rank receives unencrypted communication data from the ECU having a lower priority rank, the ECU having the higher priority rank encrypts the received communication data using an encryption key that it manages and then transmits the encrypted communication data to the on-board communication device 300 through the communication lines NW5, NW6. The on-board communication device 300 transmits the communication data, which is received from the ECU, to the center 400 located outside the vehicle via the external interface 360.

The operation of the encrypted communication system of the present embodiment will now be described particularly focusing on the operation when the first ECU 100 and the second ECU 200 perform encrypted communication with the center 400.

Figure 4:
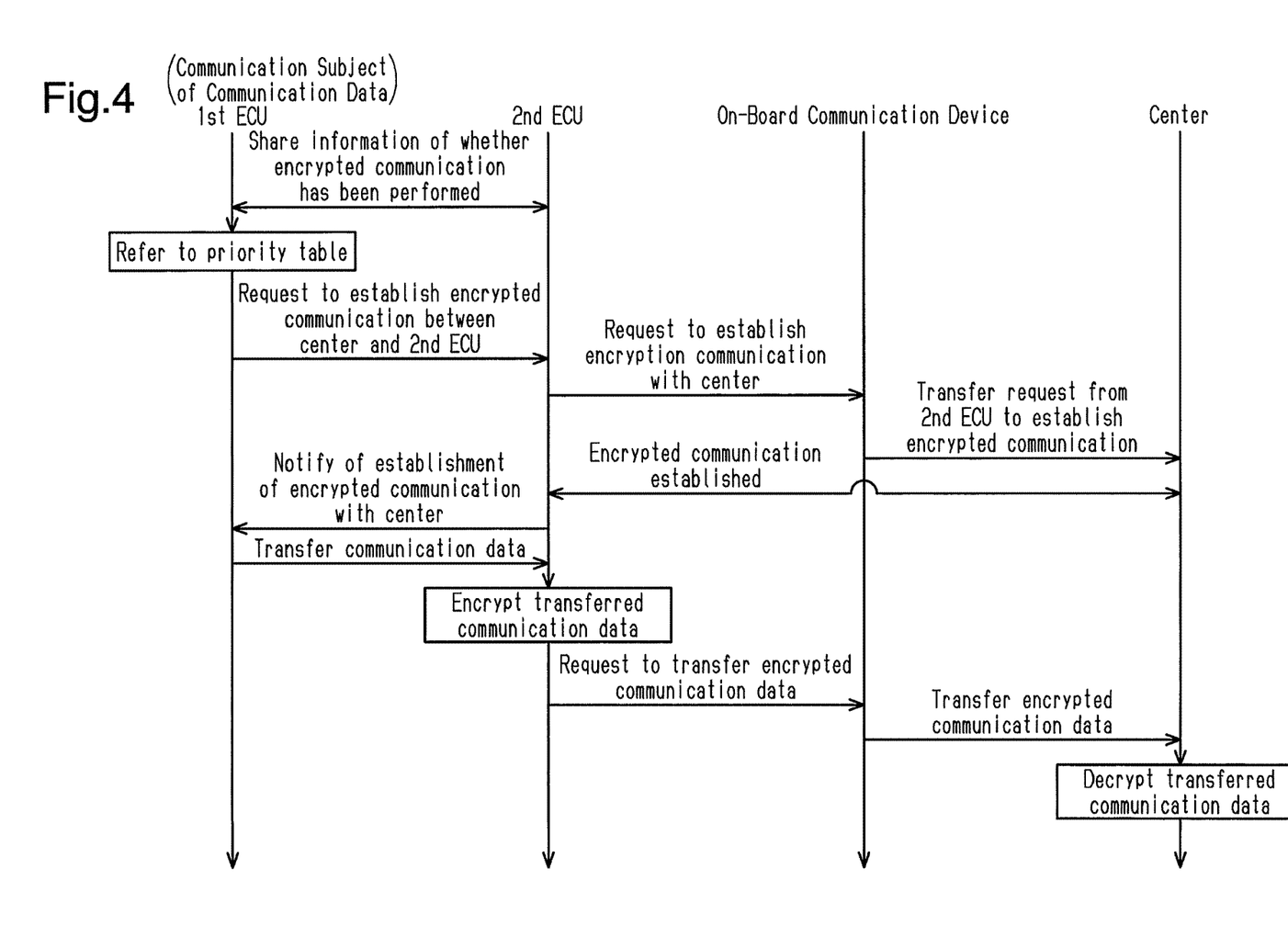
FIG. 4 is a sequence chart showing a flow of information when the encrypted communication system of FIG. 1 performs encrypted communication with a center.

As shown in FIG. 4, when the communication subject of communication data is the first ECU 100, the first ECU 100 shares, with the second ECU 200, information of whether or not encrypted communication has been performed with the center 400.

The first ECU 100 refers to the priority table 121, in which the priority ranks are set based on whether or not the first and second ECUs 100, 200 have performed encrypted communication, to determine the communication subject of encrypted communication. In the present embodiment, as shown in FIGS. 2A and 3A, the second ECU 200 is set to a higher priority rank than the first ECU 100. Thus, the second ECU 200 is determined as the communication subject of encrypted communication. The first ECU 100 requests the second ECU 200 to establish encrypted communication between the center 400 and the second ECU 200.

The second ECU 200 then requests the on-board communication device 300 to establish encrypted communication with the center 400 based on the request from the first ECU 100. The on-board communication device 300 transfers the request from the second ECU 200 to the center 400 to establish encrypted communication. Consequently, the encrypted communication is established between the second ECU 200 and the center 400.

When the encrypted communication with the center 400 is established, the second ECU 200 notifies the first ECU 100 of the establishment. The first ECU 100 transfers unencrypted communication data that it manages to the second ECU 200 through the communication line NW5.

The second ECU 200 encrypts the communication data, which is transferred from the first ECU 100, using the encryption key 263, which it manages, and requests the on-board communication device 300 to transfer the encrypted communication data. The on-board communication device 300 transfers the encrypted communication data to the center 400 based on the request from the second ECU 200.

The center 400 retrieves the encryption key corresponding to the ID of the second ECU 200 from its own database and decrypts the communication data, which is transferred from the on-board communication device 300, using the retrieved encryption key to obtain the unencrypted communication data.

Figure 5:
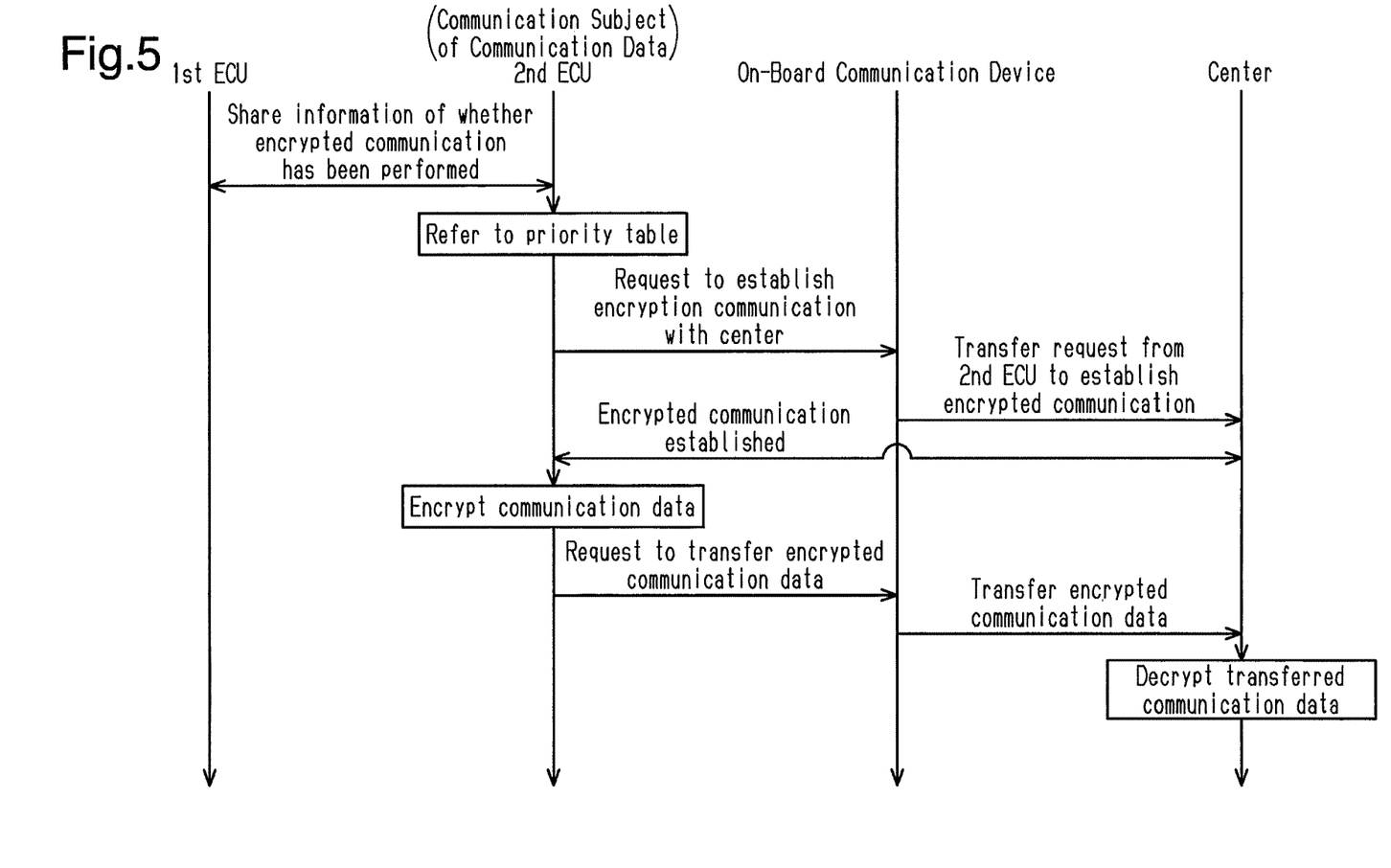
FIG. 5 is a sequence chart showing a flow of information when the encrypted communication system of FIG. 1 performs encrypted communication with the center.

As shown in FIG. 5, when the communication subject of communication data is the second ECU 200, the second ECU 200 first shares, with the first ECU 100, information of whether or not encrypted communication has been performed with the center 400.

Then, the second ECU 200 refers to the priority table 221, in which the priority ranks are set based on whether or not the first and second ECUs 100, 200 have performed encrypted communication, to determine the communication subject of encrypted communication. As described above, in the present embodiment, the second ECU 200 is set to a higher priority rank than the first ECU 100. Thus, the second ECU 200 is determined as the communication subject of encrypted communication.

Then, the second ECU 200 requests the on-board communication device 300 to establish encrypted communication with the center 400. The on-board communication device 300 transfers the request from the second ECU 200 to the center 400 to establish encrypted communication. Consequently, the encrypted communication is established between the second ECU 200 and the center 400.

When the encrypted communication with the center 400 is established, the second ECU 200 encrypts communication data that it manages using the encryption key 263, which it manages, and requests the on-board communication device 300 to transfer the encrypted communication data. The on-board communication device 300 transfers the encrypted communication data to the center 400 based on the request from the second ECU 200.

The center 400 retrieves the encryption key corresponding to the ID of the second ECU 200 from its own database and decrypts the communication data, which is transferred from the on-board communication device 300, using the retrieved encryption key to obtain the unencrypted communication data.

The effects of the encrypted communication system of the present embodiment will now be described.

In general, when a plurality of ECUs installed in a vehicle separately performs encrypted communication with the center 400 located outside the vehicle, the center 400 normally needs to manage encryption keys (secret keys) separately set for each ECU. With this configuration, as the number of ECUs performing encrypted communication is increased, the resources of the center 400 used for the encrypted communication process would be increased.

In this regard, in the present embodiment, when a predetermined one of the first ECU 100 and the second ECU 200 performs encrypted communication with the center 400, the predetermined ECU refers to the priority tables 121, 221 to check the priority ranks of the ECUs 100, 200 for encrypted communication. When the predetermined ECU performs encrypted communication with the center 400, if another ECU has a higher priority rank than the predetermined ECU, the predetermined ECU uses the encryption key managed by the ECU having the higher priority rank. This limits increases in the resources of the center 400 used for the encrypted communication process, which would result when the number of ECUs performing encrypted communication is increased.

Particularly, in the present embodiment, when any one of the first ECU 100 and the second ECU 200 has performed encrypted communication with the center 400, the ECU having performed encrypted communication is set to a higher priority rank than the other ECU. More specifically, when one of the first ECU 100 and the second ECU 200 has performed encrypted communication with the center 400, the encryption key managed by the ECU having performed encrypted communication is also used to transmit communication data of the other ECU through encrypted communication performed with the center 400. Thus, even when the number of ECUs performing encrypted communication is increased, the center 400 needs to manage only the encryption key used in encrypted communication performed with the ECU that has first established encrypted communication. This reduces the resources of the center 400 used for the encrypted communication process.

Further, in the present embodiment, when a third ECU is newly connected to the vehicle network NW4, if any one of the first ECU 100 and the second ECU 200, which have been connected to the vehicle network NW4, has performed encrypted communication with the center 400, the ECU having performed encrypted communication is set to a higher priority rank than the third ECU, which is added as described above. Thus, when the newly added third ECU performs encrypted communication with the center 400, only the encryption key that is already held by the center 400 needs to be used to encrypt and decrypt communication data. That is, even when the third ECU is newly connected to the vehicle network NW4, the addition of the third ECU will not increase the resources of the center 400 used for the encrypted communication process.

Additionally, in the present embodiment, when a predetermined ECU performs encrypted communication with the center 400, if neither of the first ECU 100 and the second ECU 200, which are installed in the vehicle, has performed encrypted communication with the center 400, the cipher strengths of encrypted communications performed by the encrypted communication portions 160, 260 of the first and second ECUs 100, 200 are compared to each other. One of the ECUs having a relatively high cipher strength is set to a higher priority than the other ECU. More specifically, when neither of the first ECU 100 and the second ECU 200 has performed encrypted communication with the center 400, the encryption key managed by the ECU having the relatively high cipher strength is also used to transmit communication data of the other ECU through encrypted communication performed with the center 400. Consequently, while the resources of the center 400 used for the encrypted communication process are reduced, the security level of encrypted communication of the first and second ECUs 100, 200 performed with the center 400 is increased.

Additionally, in the present embodiment, even when the third ECU is newly connected to the vehicle network NW4, if neither of the first ECU 100 and the second ECU 200 has performed encrypted communication with the center 400, the cipher strengths of encrypted communications performed by the ECUs connected to the vehicle network NW4, including the newly added third ECU, are compared to each other. Then, one of the ECUs having a relatively high cipher strength is set to a higher priority rank than the rest of the ECUs. More specifically, when the encrypted communication performed by the newly added third ECU has a higher cipher strength than the encrypted communication performed by the other ECUs, the encryption key managed by the third ECU is also used to transmit communication data of the other ECUs through encrypted communication performed with the center 400. This reduces the resources of the center 400 used for the encrypted communication process. Additionally, the ECU having the higher cipher strength is newly connected to the vehicle network NW4. This increases the security level of encrypted communication of all of the ECUs connected to the vehicle network NW4 performed with the center 400.

Accordingly, the above embodiment has the advantages described below.

(1) Even when the plurality of the ECUs 100, 200 having the encrypted communication portions 160, 260 is installed in a single vehicle, the ECUs 100, 200 perform encrypted communication with the center 400 using the encryption key managed by one of the ECUs having a higher priority rank. Thus, as compared to when the ECUs 100, 200 perform encrypted communication with the center 400 located outside the vehicle using encryption keys unique to each of the ECUs 100, 200, the resources of the center 400 used for the encrypted communication process are reduced. Additionally, each of the ECUs 100, 200 is capable of independently performing encrypted communication with the center 400.

(2) When any one of the ECUs 100, 200 has performed encrypted communication with the center 400, the center 400 already holds the encryption key used in encrypted communication performed between the center 400 and the ECU having performed encrypted communication. When one of the ECUs 100, 200 that has not performed encrypted communication transmits communication data to the center 400, the communication data is encrypted using the encryption key managed by the ECU having performed encrypted communication. This allows the center 400 to perform encrypted communication with the ECU without obtaining a new encryption key. Consequently, while the resources of the center 400 used for the encrypted communication process are reduced, each of the ECUs 100, 200 is capable of independently performing encrypted communication with the center 400.

(3) Another ECU may be newly added to perform encrypted communication with the center 400. Even in this case, when the newly added ECU transmits communication data to the center 400, the communication data is encrypted using the encryption key managed by an ECU having performed encrypted communication. This limits increases in the resources of the center 400 used for the encrypted communication process, which would result when an ECU is added to perform encrypted communication with the center 400.

(4) When none of the plurality of ECUs 100, 200 has performed encrypted communication with the center 400, encrypted communication is established between the center 400 and one of the ECUs having a relatively high cipher strength. Then, communication data of the other ECU is encrypted using the encryption key of the ECU that established encrypted communication with the center 400. Consequently, while the resources of the center 400 used for the encrypted communication process are reduced, the security level of encrypted communication of the ECUs 100, 200 performed with the center 400 is increased.

(5) When an ECU is newly added to perform encrypted communication with the center 400, none of the existing ECUs 100, 200 may have performed encrypted communication with the center 400. In this case, under a condition in which the encrypted communication of the newly added ECU has a higher cipher strength than the encrypted communication of the existing ECUs 100, 200, encrypted communication is established between the newly added ECU and the center 400. Then, the encryption key of the newly added ECU is used to encrypt communication data of the other ECUs. This reduces the resources of the center 400 used for the encrypted communication process. Additionally, the addition of the ECU having the higher cipher strength increases the security level of encrypted communication of all of the ECUs installed in the vehicle performed with the center 400.

(6) The dedicated communication lines NW5, NW6, which easily ensure the information security as compared to the vehicle network NW4, are used as the communication paths used when an ECU transmits unencrypted communication data to another ECU. Thus, as compared to a configuration in which the plurality of ECUs 100, 200 transmits unencrypted communication data through the mutually connected vehicle network NW4, the risk of unencrypted communication data being eavesdropped by a third party is limited. This further increases the security level of encrypted communication performed between the center 400 and the plurality of ECUs 100, 200.

The above embodiment may be modified as follows.

In the above embodiment, when an ECU is newly added to perform encrypted communication with the center 400, if any one of the existing ECUs 100, 200 has performed encrypted communication with the center 400, communication data is encrypted using the encryption key that is managed by the ECU having performed encrypted communication without considering the cipher strength of encrypted communication of the newly added ECU. Instead, even when any one of the existing ECUs 100, 200 has performed encrypted communication with the center 400, the encryption key that is managed by the newly added ECU may be used to encrypt communication data of each of the newly added ECU and the existing ECUs 100, 200, if necessary, by resetting the data related to whether or not encrypted communication has been performed.

In the above embodiment, the dedicated communication lines NW5, NW6, which easily ensure the information security as compared to the vehicle network NW4, are used as the communication paths used to transmit unencrypted communication data from one ECU to another ECU. However, if the information security can be ensured in communication performed through the vehicle network NW4, unencrypted communication data may be transmitted between the ECUs through the vehicle network NW4. In this case, the dedicated communication lines NW5, NW6, which connect the ECUs 100, 200 to each other or the second ECU 200 and the on-board communication device 300, may be omitted from the configuration.

In the above embodiment, when none of the ECUs connected to the vehicle network NW4 has performed encrypted communication with the center 400, the priority ranks for encrypted communication are set in advance based on the cipher strengths of encrypted communications performed by the ECUs. Instead, when none of the ECUs connected to the vehicle network NW4 has performed encrypted communication with the center 400, after all of the ECUs are connected to the vehicle network NW4, one of the ECUs that first performs encrypted communication with the center 400 may be set to a higher priority rank than the rest of the ECUs without taking into any consideration the cipher strengths of encrypted communications performed by the ECUs.

The above embodiment is described as an example in which the ECUs 100, 200 connected to the vehicle network NW4 differ from each other in the cipher strength of encrypted communication. However, the ECUs 100, 200 connected to the vehicle network NW4 do not necessarily have to differ from each other in the cipher strength of encrypted communication. In this case, for example, the priority ranks of the ECUs for encrypted communication are not set in advance. After the ECUs 100, 200 are connected to the vehicle network NW4, one of the ECUs that first performs encrypted communication with the center 400 may be set to a higher priority than the other ECU.

In the above embodiment, when none of the ECUs connected to the vehicle network NW4 has performed encrypted communication with the center 400, the priority ranks for encrypted communication are set in advance based on the cipher strengths of encrypted communications performed by the ECUs. However, the priority ranks for encrypted communication may be set in advance based on elements other than the cipher strengths of encrypted communications, for example, the processability of the CPUs mounted on the ECUs, the distances to the on-board communication device 300 through the communication lines NW5, NW6 on the network, or the like. More specifically, among a plurality of ECUs, one of the ECUs having more advantageous conditions for performing encrypted communication only needs to be set to a higher priority rank.

The setting the priority ranks of the plurality of ECUs 100, 200 for encrypted communication in the priority tables 121, 221 may mean that the priority tables 121, 221, in advance, store priority ranks that are automatically or manually set before or when the vehicle is shipped, that the priority tables 121, 221 automatically set priority ranks after the shipment of the vehicle, or that the priority tables 121, 221 store priority ranks that are manually set after the shipment of the vehicle.

The above embodiment is described as an example in which the ECUs 100, 200 and the center 400 perform encrypted communication in accordance with public key cryptography. However, the encrypted communication method of the ECUs 100, 200 and the center 400 does not necessarily have to be limited to the public key cryptography and may be a different encrypted communication method such as symmetric key cryptography.

Therefore, the present examples and embodiments are to be considered as illustrative and not restrictive and the invention is not to be limited to the details given herein, but may be modified within the scope and equivalence of the appended claims.

The invention claimed is:

1. An encrypted communication system comprising a plurality of on-board devices configured to perform encrypted communication with a server located outside a vehicle, wherein
each of the plurality of on-board devices includes
an encrypted communication portion configured to perform encrypted communication with the server using an encryption key unique to the each of the plurality of on-board devices, and
a priority setting portion configured to set priority ranks of the plurality of on-board devices for encrypted communication, and
when a first on-board device of the plurality of on-board devices performs encrypted communication with the server and if any one of the plurality of on-board devices is set to a higher priority rank, the first on-board device is configured to perform the encrypted communication with the server via the encrypted communication portion of the on-board device having the higher priority rank, the first on-board device being configured to transfer unencrypted communication data to the on-board device having the higher priority rank for being encrypted by the encryption key of the on-board device having the higher propriety.

2. The encrypted communication system according to claim 1, wherein if any one of the plurality of on-board devices has performed encrypted communication with the server, the priority setting portion of each of the plurality of on-board devices is configured to set the on-board device having performed encrypted communication to a higher priority rank than the rest of the plurality of on-board devices.

3. The encrypted communication system according to claim 2, wherein when an on-board device is newly added to perform encrypted communication with the server and if any one of the plurality of on-board devices has performed encrypted communication with the server, the priority setting portion of each of the plurality of on-board devices is configured to set the on-board device having performed encrypted communication to a higher priority rank than the added on-board device.

4. The encrypted communication system according to claim 2, wherein if none of the plurality of on-board devices has performed encrypted communication with the server, the priority setting portion of each of the plurality of on-board devices is configured to set one of the plurality of on-board devices having a relatively high cipher strength to a higher priority rank than the rest of the plurality of on-board devices.

5. The encrypted communication system according to claim 2, wherein when an on-board device is newly added to perform encrypted communication with the server and if none of the plurality of on-board devices has performed encrypted communication with the server and the added on-board device has a higher cipher strength than the plurality of on-board devices, the priority setting portion of each of the plurality of on-board devices is configured to set the added on-board device to a higher priority rank than the plurality of on-board devices.

6. The encrypted communication system according to claim 1, further comprising a communication line connecting each of the plurality of on-board devices and another one of the plurality of on-board devices separately from the rest of the plurality of on-board devices, wherein when the first on-board device of the plurality of on-board devices performs encrypted communication with the server and if any one of the plurality of on-board devices is set to a higher priority rank, the first on-board device is configured to transmit the unencrypted communication data to the on-board device having the higher priority rank through the communication line.

7. A method for controlling an encrypted communication system including a plurality of on-board devices configured to perform encrypted communication with a server located outside a vehicle, the method comprising:

having each of the plurality of on-board devices set priority ranks of the plurality of on-board devices for encrypted communication; and having, when a first on-board device of the plurality of on-board devices performs encrypted communication with the server and if any one of the plurality of on-board devices is set to a higher priority rank, the first on-board device perform via the on-board device having the higher priority rank, the encrypted communication with the server using an encryption key unique to the on-board device having the higher priority rank, wherein the first on-board device is configured to transfer unencrypted communication data to the on-board device having the higher priority rank for being encrypted by the encryption key of the on-board device having the higher propriety.

8. An encrypted communication system comprising a plurality of on-board devices configured to perform encrypted communication with a server located outside a vehicle, wherein each of the plurality of on-board devices includes circuitry, the circuitry is configured to set priority ranks of the plurality of on-board devices for encrypted communication, and when the circuitry performs encrypted communication with the server and if any one of the plurality of on-board devices is set to a higher priority rank, the circuitry is configured to perform via the on-board device having the higher priority rank, the encrypted communication with the server using an encryption key unique to the on-board device having the higher priority rank, wherein the circuitry is configured to transfer unencrypted communication data to the on-board device having the higher priority rank for being encrypted by the encryption key of the on-board device having the higher propriety.

* * * * *